United States Patent [19]

Lasko

[11] 4,068,863
[45] Jan. 17, 1978

[54] PIPE JOINT

[76] Inventor: John A. Lasko, 50 Notch Hill Road, North Branford, Conn. 06471

[21] Appl. No.: 732,427

[22] Filed: Oct. 14, 1976

[51] Int. Cl.² ............................................. F16L 19/00
[52] U.S. Cl. ..................................... 285/39; 285/179; 285/356; 285/415
[58] Field of Search ............... 285/356, 321, 393, 250, 285/348, 354, 389, 387, 388, 415, 357, 39

[56] References Cited

U.S. PATENT DOCUMENTS

| | | | |
|---|---|---|---|
| 1,853,411 | 4/1932 | Gentry et al. | 285/356 X |
| 2,441,344 | 5/1948 | Bosworth | 285/321 |
| 2,628,111 | 2/1953 | Smalline | 285/389 X |
| 2,644,700 | 7/1953 | Woodling | 285/348 X |
| 3,552,781 | 1/1971 | Helland | 285/356 X |
| 3,558,163 | 1/1971 | Moore et al. | 285/321 X |
| 3,700,268 | 10/1972 | Nielsen, Jr. | 285/348 X |
| 3,733,093 | 5/1973 | Seiler | 285/356 X |
| 3,871,691 | 3/1975 | Takagi et al. | 285/321 |

FOREIGN PATENT DOCUMENTS

| | | | |
|---|---|---|---|
| 681,220 | 1/1930 | France | 285/356 |
| A67,460 | 10/1957 | France | 285/356 |
| 2,404,092 | 7/1975 | Germany | 285/321 |
| 1,048,103 | 12/1958 | Germany | 285/356 |

*Primary Examiner*—Thomas F. Callaghan
*Attorney, Agent, or Firm*—H. Gibner Lehmann; K. Gibner Lehmann

[57] ABSTRACT

A mechanical pipe joint comprising a length of metal pipe having an annular groove at one end, in which there is loosely received an annular compression ring. A companion pipe fitting part is provided, which telescopically receives the metal pipe. Disposed between the latter and the pipe fitting part is an axially compressible, radially expansible packing ring. One end of the packing ring seats against an internal shoulder on the companion pipe fitting part, with the other end of the packing ring being engageable with the compression ring. The pipe fitting part has internal screw threads, and a hollow nut having external screw threads is received in the bore of the fitting part, with the inner end of the nut being engageable with the compression ring. A second shoulder is provided in the bore of the pipe fitting part, constituting a seat for the end of the metal pipe. The arrangement is such that tightening of the nut first causes axial compression and radial expansion of the packing ring, and thereafter effects bottoming of the end of the metal pipe on the second shoulder in the bore of the pipe fitting part when a desired, predetermined amount of compression of the packing ring has occurred.

1 Claim, 5 Drawing Figures

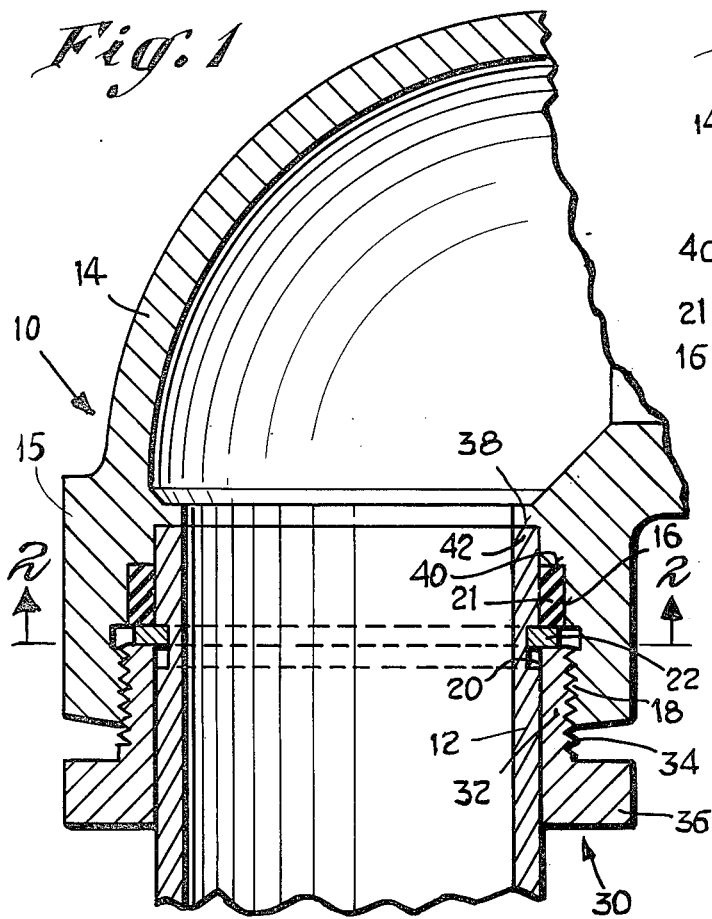
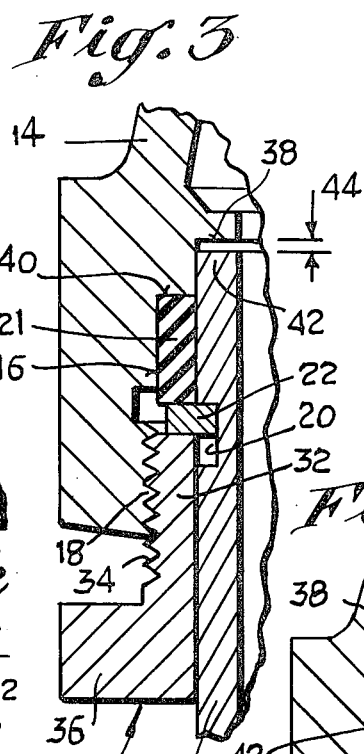
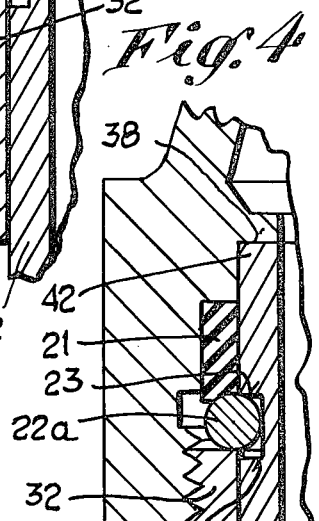
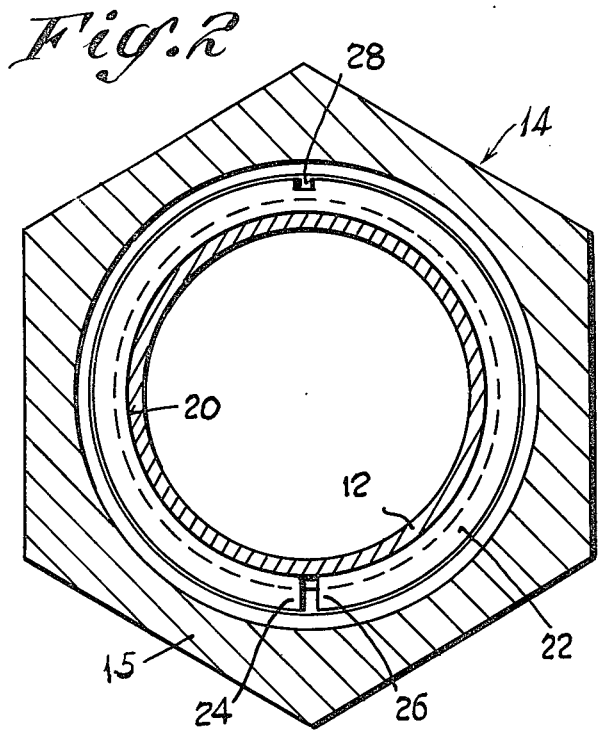
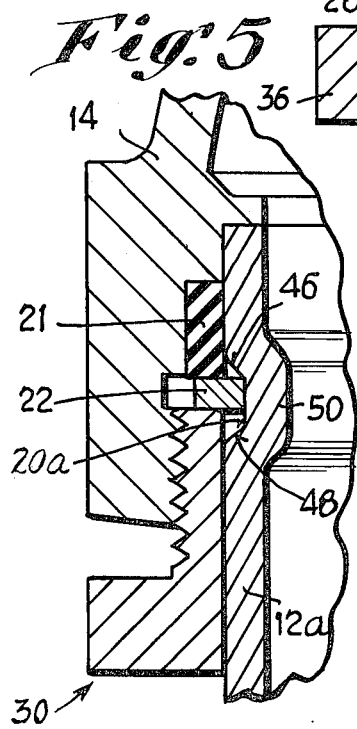

PIPE JOINT

BACKGROUND

This invention relates generally to pipe joint seals for coupling adjacent ends of aligned pipe sections, and more particularly to seals of the type employing a compressible packing ring which is adapted to undergo radial expansion into sealing engagement with adjacent wall portions of the pipe sections.

In the past, a number of sealing pipe constructions have been proposed and produced. U.S. Pat. No. 3,781,040 shows a pipe joint including a resilient annular sealing ring having a flange portion which is adapted to be compressed between one end of a thin-walled pipe and an internal shoulder in the bore of a companion pipe fitting. Compression of the ring is effected by tightening a series of circumferentially spaced screws which are disposed at an angle with respect to a radial section through either of the pipes. While the above arrangement was found to be satisfactory in many respects, problems were sometimes encountered in that it was not always evident as to how much the screws should be tightened. Moreover, there was the possibility that unequal pull-up of the screws would cause the thin-walled pipe to shift to an eccentric position with respect to the companion fitting, possibly giving rise to leaks. In addition, the dimensions of the groove in which the screws were received had to be kept to close tolerances, as did the dimensions of the annular sealing gasket, in order to insure a tight seal.

Another construction is shown in U.S. Pat. No. 3,847,392, illustrating an extensible pipe fitting for a sprinkler system, wherein a resilient sealing gasket is expanded radially into tight frictional and sealing engagement with adjacent wall portions of telescoping inner and outer pipes. Expansion of the gasket was effected by a locking nut. In such a construction, it was not evident as to how much the nut should be tightened. Moreover, there was also the danger that excessive tightening of the nut would cause permanent deformation or crumbling of the gasket, thus defeating its effectiveness as a seal. Accordingly, the installer had to be extremely careful not to overtighten such nuts, while still insuring that a leak resistant seal was established.

Still other arrangements involved special pipes or tubing which had washer-like shoulders which were welded in place, and against which the sealing ring would bear. Special tubing involving welding operations was expensive to produce, and added unnecessary extra costs to the manufacturing process.

SUMMARY

The above disadvantages and drawbacks of prior pipe joint seals are obviated by the present invention which has for an object the provision of a novel and improved mechanical pipe joint coupling which is simple in construcion, reliable in operation, and which provides a positive indication to the operator or user as to when proper expansion of a sealing member has occurred. A related object of the invention is the provision of a pipe joint seal as above, wherein there is greatly minimized the likelihood of damage to a resilient sealing member, through inadvertent over-compression or over-tightening. Still another object of the invention is the provision of a seal as above, which employs readily available components, such as thin-walled, standard metal pipe, thus tending to keep the overall cost down and resulting in a product which is adaptable for use in a wide variety of installations.

The above objects are accomplished by a mechanical pipe joint comprising a length of metal pipe having an annular external groove in one end portion, a compression ring disposed in the annular groove, and a compressible packing ring surrounding the end portion of the pipe. A companion pipe fitting part is provided, having a bore in which the pipe end, the compressible packing ring and the compression ring are received. The companion pipe fitting part includes two shoulders, one for engagement with an end of the compressible packing ring, and the other shoulder for engagment with the end of the metal pipe. A compression nut is provided, having external screw threads which engage cooperable internal screw threads on the companion pipe fitting. The arrangement is such that tightening of the nut first causes shifting of the compression ring in the annular groove on the end of the metal pipe, which in turn effects compression of the packing ring and a consequent seal between the outer surface of the metal pipe and the bore of the companion pipe fitting. Thereafter a bottoming of the metal pipe on the second shoulder of the pipe fitting occurs, this indicating to the user that the proper degree of tightening has been reached. The arrangement is such that excessive compression of the packing ring is effectively prevented, and as a result damage thereto is greatly minimized. Moreover, there is no uncertainty on the part of the installer that the optimum degree of radial expansion of the packing ring has occured.

The provision of a compression ring loosely carried in the annular groove of the pipe eliminates the need for welding a special washer-like shoulder on the latter. Accordingly, standard thin-walled pipe can be used. Installation of the ring in the groove is readily accomplished, without the need for special tools or complex assembly equipment.

Other features and advantages hereinafter appear.

In the drawings, illustrating several embodiments of the invention:

FIG. 1 is a vertical section of the improved pipe joint seal of the present invention, particularly showing a thin-walled pipe, a companion pipe fitting part having two internal annular shoulders, a compression nut, and a split compression ring carried in an annular groove on the outer surface of the thin-walled pipe.

FIG. 2 is a section taken on line 2—2 of FIG. 1.

FIG. 3 is a fragmentary section similar to FIG. 1, showing the arrangement of the various parts before the compression nut has been fully tightened.

FIG. 4 is a fragmentary section of a somewhat modified construction, constituting another embodiment of the invention.

FIG. 5 is a fragmentary section of a still further modified construction, constituting yet another embodiment of the invention.

Referring to FIGS. 1–3 and in accordance with the present invention there is illustrated a novel and improving pipe joint seal generally designated by the numeral 10 and comprising a section of thin-walled steel pipe 12 which may be of the size known as Schedule 10 or less, or 0.188 thickness wall or less, and a companion pipe fitting part 14 which may take the form of an elbow as shown, or may be a T-fitting or another straight section of pipe, having a hex portion 15. The companion fitting part has a hollow bore 16 which is internally threaded at 18 for a length, with the pipe 12 being received therein. Interposed between the pipe 12 and the walls of the companion fitting 14 is a resilient, axially compressible, radially expansible packing ring 21 which may be constituted of rubber or other suitable plastic material having the necessary elasticity.

The pipe 12 includes an annular groove 20 near one end, in which there is loosely received a compression ring 22 of generally rectangular cross-section, having two opposite flat sides and four sharp corners, one of which can fit into a corresponding sharp corner of the groove 20. The ring is preferably constituted of tempered steel. In addition, as shown in FIG. 2 the ring is split or cut, including juxtaposed end portions 24, 26. A notch or slot 28 is provided in the ring, opposite the location of the ends 24, 26, to enable the ring to be sprung apart a limited amount during its installation in the groove 20, prior to the assembly of the pipe joint. The groove 20 is shown in FIG. 1 as being roughly twice as wide as the thickness of the ring, such that the latter can seat loosely therein.

Also provided is a compression nut 30 including a sleeve part 32 having external threads 34 engageable with the internal threads 18 of the companion pipe fitting part 14. The nut 30 has a hex portion 36 for engagement by a suitable wrench.

The bore 16 of the companion pipe fitting is seen to have two annular abutment shoulders 38, 40, with the latter constituting a seat for one end of the packing ring 21. The remaining shoulder is of smaller diameter, preferably on the order of that of the thin-walled pipe 12, and constitutes a seat or abutment for the end 42 of the pipe when the nut 30 is tightened, as will be explained below.

The operation of the improved pipe joint seal of the present invention may now be readily understood by referring to FIGS. 1 and 3. Before assembly of the pipe 12 to the companion pipe fitting 14, the compression nut 30 is slipped over the free end of the pipe 12, the compression ring 22 is spread slightly as permitted by the slot 28, and thereafter snapped into the annular groove 20. Then the packing ring 21 is installed.

The assembly consisting of the pipe 12, compression ring 22, nut 30 and packing ring 21 is then inserted into the bore 16 of the companion pipe fitting 14, and the nut 30 tightened by means of a suitable wrench engaging the hex portion 36. As the nut 30 is tightened, the sleeve portion 32 bears against the ring 22, and begins to effect axial compression and radial expansion of the packing ring 21, such that the latter sealingly engages adjacent wall areas of the bore 16 and the thin-wall pipe 12. As shown particularly in FIG. 3, the dimensions of the ring 21 and the location of the groove 20 are such that a small gap 44 exists between the shoulder 38 and the end 42 of the pipe 12 when such compression of the ring 21 commences. As the tightening of the nut 30 progresses, a limited, optimum axial compression of the ring 21 takes place, after which the end 42 of the pipe 12 comes into engagement with or "bottoms" on the shoulder 38. Accordingly, further tightening of the nut 30 is prevented. Such a construction is seen to have two distinct advantages. First, it prevents excessive axial compression of the ring 21 beyond a certain predetermined or optimum point. The optimum compression is determined experimentally, and is sufficient to constitute an effective seal between the parts, but not great enough as to cause permanent deformation or crumbling of the ring 21. In addition, when the end 42 of the pipe 12 finally engages the shoulder 38, the person installing the fitting will realize that the proper tightening of the nut 30 has been effected. There is thus no guessing on the part of the user as to how far to pull up the nut 30. It is seen in FIG. 3 that the thickness of the compression ring 22 in a radial direction is sufficient to transmit force from the sleeve portion 32 to both the pipe 12 and the ring 21 simultaneously, which enables the operation described above to occur. The diameter of the bore 16 is slightly greater than the external diameter of the compression ring 22 to enable the latter to be forcibly inserted in the bore while at the same time preventing the material of the packing ring 21 from squeezing out between the walls of the bore 16 and the compression ring 22.

Another embodiment of the invention is shown in FIG. 4 wherein like reference numerals denote similar parts. By the present invention, there is provided in the annular groove 20 of the thin-walled pipe a wire 22a of generally circular cross-sectional configuration. The wire is of sufficient diameter to enable it to simultaneously engage both the packing ring 21 and the wall portion 23 of the groove 20. The wire is preferably constituted of tempered steel, and constitutes a split ring which can be snapped into the groove 20 as in the previous embodiment. The operation of this embodiment is substantially the same as that of the first embodiment, in that when the nut 30 is tightened, the sleeve portion 32 engages the ring 22a, which in turn effects a predetermined axial compression of the ring 21 and thereafter causes bottoming of the pipe end 42 on the shoulder 38, after the predetermined compression of the ring 21 has taken place.

Still another embodiment of the invention is illustrated in FIG. 5, wherein a somewhat modified thin-wall pipe 12a is employed. The latter includes an annular groove 20a which is formed by rolling in the pipe wall in a suitable fixture (not shown), forming sloping or beveled wall surfaces 46, 48, and an inner bulge 50. The compression ring 22 is substantially identical to that of the first embodiment, as are the packing ring 21, the companion pipe fitting 14 and the compression nut 30. The operation of this embodiment is substantially the same as that of the first two embodiments, and accordingly need not be repeated.

From the above it can be seen that I have provided novel and improved pipe joint seals which are simple in construction and reliable in operation. The constructions disclosed effectively overcome many of the problems associated with prior pipe joint seals by removing all doubt on the part of the operator as to how far to tighten the compression nut. In addition, excessive compression of the resilient packing ring is prevented, thus insuring proper operation of the joint as well as a long life expectancy. The constructions described above, involving a compression ring and standard thin-wall pipe having either a rolled-in groove formed by a suitable grinding operation, eliminate the need for special tools or welded parts, thus reducing the overall cost without sacrificing reliability.

In actual tests performed on samples employing two inch diameter thin-walled pipe, pressures of up to 1,000 PSI were withstood with no indication of failure or leakage. This is considerably above the pressure required in typical installations, which runs up to 500 PSI normally.

The devices are thus seen to represent a distinct advance and improvement in the technology of pipe couplings.

Variations and modifications are possible without departing from the spirit of the invention.

I claim:

1. A mechanical pipe joint comprising, in combination:
    a. a length of metal pipe having an annular external groove in said pipe axially spaced from one end thereof
    b. a compression ring disposed in said annular groove,
    c. a cylindrical compressible packing ring surrounding the end portion of the pipe between the substantially radial end surface of the pipe and said compression ring, adapted for engagement by the latter,
    d. a companion pipe fitting part having a bore in which the pipe end, the compressible packing ring and the compression ring are received, said bore having a first substantially radial shoulder for engagement with the substantially radial end surface of the pipe, said bore having a second substantially radial shoulder and a cylindrical portion adjacent said second shoulder, said packing ring having a substantially radial end surface in abutment with said second shoulder and an external cylindrical surface engaging said cylindrical portion,
    e. said bore of the companion fitting part having internal screw threads, and
    f. a compression nut comprising a sleeve having external screw threads engaged with the internal threads of the companion pipe fitting part and having means engageable by a wrench for applying a turning movement to it, thereby to screw the sleeve into the campanion pipe fitting part, said sleeve having an inner substantially radial end surface engageable with the compression ring whereby the pipe end can be brought up snug against its cooperable first shoulder in the fitting part through the intermediary of the compression ring, said ring simultaneously exerting a compression force on the packing ring tending to bulge the latter and effect a tight seal between the companion pipe fitting part and the pipe end portion,
    g. said compression ring being split, forming two end portions juxtaposed to one another, thereby enabling the ring to be spread an extent during its installation in the annular groove,
    h. said groove having a width measured axially of the pipe, which is substantially greater than the thickness of said compression ring and on the order of roughly twice said thickness whereby the ring can shift axially on the pipe within limits determined by the engagement of the opposite sides of said ring with the opposite walls respectively of said groove so as to facilitate starting of the nut in the bore of the companion pipe fitting part.

* * * * *